United States Patent
Hubert et al.

(10) Patent No.: US 12,333,699 B2
(45) Date of Patent: Jun. 17, 2025

(54) METHOD AND COMPUTER PROGRAM PRODUCT FOR AUTOMATED DEFECT DETECTION DURING BORESCOPING OF AN ENGINE

(71) Applicant: Lufthansa Technik AG, Hamburg (DE)

(72) Inventors: Wiebke Hubert, Hamburg (DE); Jan Oke Peters, Hamburg (DE); Eva Lang, Offenbach am Main (DE); Matthias Platho, Mainz (DE); Alexander Appel, Woellstadt (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 444 days.

(21) Appl. No.: 17/638,215

(22) PCT Filed: Aug. 26, 2020

(86) PCT No.: PCT/EP2020/073808
§ 371 (c)(1),
(2) Date: Feb. 25, 2022

(87) PCT Pub. No.: WO2021/037885
PCT Pub. Date: Mar. 4, 2021

(65) Prior Publication Data
US 2022/0245785 A1  Aug. 4, 2022

(30) Foreign Application Priority Data
Aug. 29, 2019  (EP) ..................... 19194447

(51) Int. Cl.
*G06T 7/00*  (2017.01)
*G01N 21/892*  (2006.01)

(52) U.S. Cl.
CPC ......... *G06T 7/0004* (2013.01); *G01N 21/892* (2013.01); *G01N 2021/8924* (2013.01); *G06T 2207/30164* (2013.01)

(58) Field of Classification Search
CPC ......... G06T 7/0004; G06T 2207/30152; G06T 2207/30141; B23K 31/12; B23K 3/08;
(Continued)

(56) References Cited

U.S. PATENT DOCUMENTS

| 4,948,660 A | 8/1990 | Rias et al. |
| 6,266,138 B1 * | 7/2001 | Keshavmurthy ...... G01N 21/88 356/600 |

(Continued)

FOREIGN PATENT DOCUMENTS

| CN | 202024969 U | 11/2011 |
| CN | 102998363 A | 3/2013 |

(Continued)

OTHER PUBLICATIONS

Wolfgang Adam et al, "Bildauswertung Zur Prufung Von Werkstuckinnenflachen. Oevaluation of Images for Testing the Inside Faces of Workpiece," Zeitschrift für wirtschaftlichen Fabrikbetrieb, Apr. 1996, pp. 138-141, De Gruyter, Berlin, Germany.

(Continued)

*Primary Examiner* — Hwa Andrew Lee
(74) *Attorney, Agent, or Firm* — LEYDIG, VOIT & MAYER, LTD.

(57) ABSTRACT

A method automatically detects defects during borescoping of an engine. A video borescope is inserted into the engine such that, engine blades can be moved successively through the image region of the borescope. A possible defect on an engine blade is identified by image recognition on the basis of a video borescope frame. The movement of the engine (Continued)

blades in the image region is detected by comparing successive frames. The possible defect is tracked by optical image recognition on the basis of the successive frames used for detecting the movement. In a condition where a trace of the possible defect on the video image corresponds to the detected movement in terms of direction and speed over a predefined length, the possible defect is identified as an actual defect.

12 Claims, 4 Drawing Sheets

(58) Field of Classification Search
CPC .. B23K 31/125; B23K 1/20; G01N 21/95607; G01N 2021/95646; G01N 21/01; G01N 21/956; G01N 2021/0112; H05K 13/083; G01B 11/06; G01K 13/00; G06Q 10/20; G06Q 50/04
See application file for complete search history.

(56) References Cited

U.S. PATENT DOCUMENTS

| | | |
|---|---|---|
| 2009/0201364 A1 | 8/2009 | Konomura |
| 2011/0025844 A1 | 2/2011 | Hori |
| 2013/0113915 A1 | 5/2013 | Scheid et al. |
| 2013/0113916 A1 | 5/2013 | Scheid et al. |
| 2013/0162846 A1 | 6/2013 | Xie et al. |
| 2021/0118146 A1* | 4/2021 | Rhodes ............ G06N 3/045 |

FOREIGN PATENT DOCUMENTS

| | | |
|---|---|---|
| CN | 106198716 A | 12/2016 |
| CN | 108167078 A | 6/2018 |
| CN | 108897925 A | 11/2018 |
| EP | 0327428 A1 | 8/1989 |
| EP | 2363575 A2 | 9/2011 |
| EP | 3276131 A1 | 1/2018 |
| JP | 2007163723 A | 6/2007 |
| JP | 2014032363 A | 2/2014 |
| JP | 2014215395 A | 11/2014 |

OTHER PUBLICATIONS

Chang et al. "Application of Faster R-CNN in industrial CT image defect detection," Chinese Journal of Image and Graphics, pp. 1061-1079, 2018, vol. 23, No. 7, Editorial and Publishing Board of JIG, Beijing, China.

Meng et al, "Research on Application of Video Borescope During Engine Inspection," Energy Conservation Technology, Jan. 2019, pp. 69-78, vol. 27, No. 1, Harbin Institute of Technology, Nan'gang, Harbin, Heilongjiang, China.

* cited by examiner

METHOD AND COMPUTER PROGRAM PRODUCT FOR AUTOMATED DEFECT DETECTION DURING BORESCOPING OF AN ENGINE

CROSS REFERENCE TO RELATED APPLICATIONS

This application is a U.S. National Phase application under 35 U.S.C. § 371 of International Application No. PCT/EP2020/073808, filed on Aug. 26, 2020, and claims benefit to European Patent Application No. EP 19194447.9, filed on Aug. 29, 2019. The International Application was published in German on Mar. 4, 2021 as WO 2021/037885 A1 under PCT Article 21(2).

FIELD

The invention relates to a method and a computer program product for automated defect detection during borescoping of an engine.

BACKGROUND

Engines, in particular jet engines of aircraft, have to be regularly inspected in order to check compliance with the technical safety requirements and to recognize any possible damage at an early stage. Particularly for inspections while the jet engine is mounted on the aircraft (on-wing), lateral flaps on the jet engine are opened and/or individual components are removed, so that an inspector can look into the interior of the jet engine directly or with the aid of a borescope in order to inspect the engine blades. In this case, the task of the inspector, directly at the eyepiece of the borescope or—in the case of a video borescope—at the video monitor connected thereto, is to assess the engine blades and reliably identify defects on the engine blades, such as e.g. notches or indentations, in the tenths of a millimeter range.

In this case, for inspecting the engine blades of an individual rotatable engine stage of the jet engine, it is known to guide them, by rotation of the engine stage, past an observation opening of the jet engine or past a borescope inserted into the jet engine in such a way that one after another all the engine blades of the engine stage of the jet engine can be assessed in the observation opening or the field of view of the borescope.

The inspection of all the engine stages of a jet engine requires a number of hours; for example, four hours have to be estimated just for the inspection of the nine stages of the high-pressure compressor of a CFM56 engine. The outcome of this is then an evaluation by the inspector, which represents the inspector's visual impression, but regularly does not satisfy the requirements in respect of a standardized appraisal.

SUMMARY

In an embodiment, the present disclosure provides a method that automatically detects defects during borescoping of an engine. In the method, a video borescope is inserted into the engine in such a way that, during rotation of an engine shaft, engine blades of an engine stage which are secured to the engine shaft are moved successively through the image region of the video borescope. A possible defect on an engine blade is identified by image recognition on the basis of a frame generated by the video borescope. The movement of the engine blades in the image region of the video borescope is detected by comparing in each case two successive frames. The possible defect on the video image along the detected movement is tracked by optical image recognition on the basis of the successive frames used for detecting the movement. In a condition where a trace of the possible defect on the video image corresponds to the detected movement in terms of direction and speed over a predefined length, the possible defect is identified as an actual defect.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
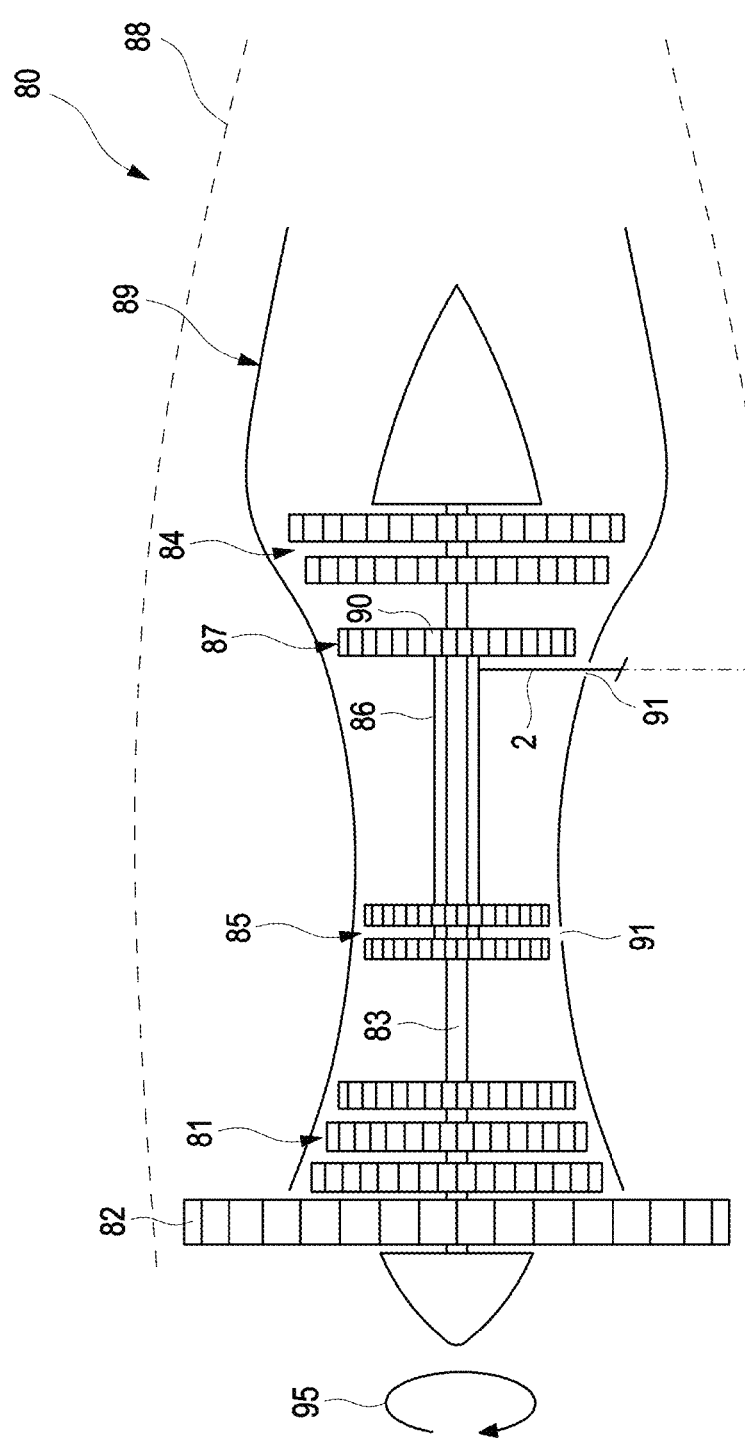
FIG. 1 shows an arrangement configured for carrying out the method according to the invention.

In an embodiment, the present invention provides a method with which the inspection of the engine blades of rotatable engine stages of a jet engine is improved.

An embodiment of the present invention relates to a method for automated defect detection during borescoping of an engine, in which a video borescope is inserted into an engine in such a way that, during rotation of an engine shaft, the engine blades of an engine stage which are secured to the engine shaft are moved successively through the image region of the video borescope. The method includes:

Identifying a possible defect on an engine blade by image recognition on the basis of a frame of the video borescope;

Detecting the movement of the engine blades in the image region of the video borescope by comparing in each case two successive frames;

Tracking the possible defect on the video image along the detected movement by optical image recognition on the basis of the frames used for detecting the movement;

If the trace of a possible defect on the video image corresponds to the detected movement in terms of direction and speed over a predefined length: identifying the possible defect as an actual defect.

An embodiment of the present invention furthermore relates to a computer program product comprising program parts which, when loaded in a computer, are designed for carrying out a method according to an embodiment of the invention.

Some terms used in association with the invention are explained below.

A "video borescope" is a borescope which provides a continuous analog or digital video image of the image region of the borescope for further processing. In this case, the image recorded by an optical unit at the free end of the borescope can be guided via an optical line to a camera at the other end of the borescope and there it can be converted to the desired video image. However it is also possible for the recorded image to be converted into a video image by a suitable chip (e.g. charge-coupled device (CCD) or complementary metal oxide semiconductor (CMOS) chip) directly at the free end of the borescope, the video image then being communicated via a data line to the other end of the borescope and being available there for further processing.

The "video image" is a continuous sequence of "frames" in which the temporal spacing between the recording of the frames is generally constant, for which reason it is also possible to have recourse to the image refresh rate as a measure of the number of frames per predefined time segment.

"Two successive frames" are two temporally successive frames. They need not necessarily be two directly successive images of the video image. It is also possible for the video image also to comprise intermediate images between the two successive frames, but the intermediate images are not taken into account at least in the determination according to the invention of the movement of the engine blades in the image region of the video borescope.

An embodiment of the present invention provides a method which makes it possible at least partly to automate the demanding, but also monotonous activity of individual assessment of the multiplicity of engine blades of an aircraft engine. In order that this (partial) automation of the inspection of the engine can be taken into consideration at all, a high reliability of the defect detection is required. This is achieved with the method according to an embodiment of the invention since both false negative and false positive results can be reduced to such a great extent that the error rate of the method according to an embodiment of the invention is comparable to, if not even lower than, that in the case of manual inspection.

The method according to embodiments of the invention is based here on an arrangement which is in the context of borescoping of an engine and in which a video borescope is inserted through a suitable opening into an aircraft engine and is oriented such that at least one engine blade of the engine stage to be examined is situated in the image region of the video borescope. Consequently, by rotation of that engine shaft to which the engine blades of the engine stage to be examined are secured, the individual engine blades of the engine stage can be moved successively through the image region of the video borescope.

Even if hereinafter, for reasons of clarity, it is assumed that the image region of the video borescope is large enough, in principle, to capture the entire blade length of the engine blades, the method according to embodiments of the invention is also suitable for assessing individual longitudinal sections of the engine blades. By means of sufficient repetition of the method for the individual longitudinal sections, it is then possible to carry out a complete inspection of the engine blades of an engine stage over the entire blade length thereof.

On the frames of the video image or at least one portion thereof, possible defects on the engine blade(s) situated in the image are identified with the aid of image recognition. What are involved at this stage are initially only "defect candidates", i.e. those distinctive features on the engine blades which are identifiable by the image recognition and which may possibly represent a defect.

By virtue of the fact that the video borescope does not just record frames as necessary, but rather provides a continuous video image, a possible movement of the engine blades can be detected by comparing in each case two successive frames. Such a movement can regularly be achieved only by rotation of the engine shaft to which the engine blades observed by the video borescope are secured. By virtue of the fact that, according to an embodiment of the invention, the movement of the engine blades is detected solely on the basis of the video image, it is unimportant how the rotational movement of the engine shaft is actually achieved. Even manual rotation of the engine shaft remains possible, as a result of which the method according to an embodiment of the invention is usable in a flexible way.

If a movement of the engine blades is detected, the possible defect identified previously is tracked on the video images along the detected movement. For this purpose, an optical image recognition is applied to those frames of the video image which are actually used for detecting the movement. It is possible here to apply the image recognition in each case to the entire frames, in order thus, e.g., also to be able to identify newly possible defects in the image region of the video borescope (see above), or else to restrict the image recognition to those regions of the frames in which the possible defect would have to be situated in accordance with the detected movement, which can result in a considerable saving of computing power. A combination of the two possibilities is also conceivable; by way of example, every fourth frame is supplied in its entirety to the image recognition, while only the regions in which possible defects identified previously would have to be situated are analyzed in each case for the intervening frames.

If a possible defect identified initially is repeatedly identified by the image recognition on a plurality of successive frames, this gives rise to a trace of the possible defect across the frames. If this trace corresponds, in terms of direction and speed, to the movement of the engine blades detected on the basis of the same frames, and if the trace furthermore has a predefined length as well, the defect previously classified only as a possible candidate can be identified as an actual defect.

By virtue of the fact that the method according to embodiments the invention does not rely on the image recognition of frames for identifying defects, incorrect results—e.g. on account of light reflections, shadow casting, contamination, dust, etc.—can be avoided. Only if a possible defect, across a plurality of frames in which the possible defect is situated at a different location on account of the movement of the engine blades, is in each case identified and thus confirmed as a possible defect is it possible to assume with very high probability that a defect is actually involved. Conversely, it holds true that if a possible defect is identified only on individual frames that are not temporally successive, it is possible to assume with very high probability that an actual defect is not involved.

It has been found that with the method according to embodiments of the invention it is possible to achieve a defect recognition accuracy at least comparable to that of manual inspection. Often it is even possible to achieve a better result.

Inter alia, in order that the defects identified in accordance with the method according to embodiments of the invention can be checked in a simple manner, it is preferred if the detection of the movement of the engine blades is used to identify the position of the individual engine blades vis-à-vis an arbitrarily chosen initial engine blade. By way of example, if the engine blade situated the most fully in the image region of the video borescope upon the first identification of a possible defect on the basis of the video image is assumed as the initial engine blade, the other engine blades can be unambiguously determined in their relative position vis-à-vis the initial engine blade by means of the detected movement correspondingly being taken into account. For example, it is thus possible to "consecutively number" the individual engine blades proceeding from the initial engine blade. As a result, by means of suitable rotation of the engine shaft with detection of the movement, a specific, already analyzed engine blade can be moved into the image region of the video borescope in order that in this way e.g. an inspector can check the defect detected by the method on the engine blade in question, which is unambiguously identifiable on the basis of the numbering, once again on the basis of a live video image in order thus to confirm or reject the defect detection. In the course of numbering the engine blades it is possible to take account of the direction of rotation of the engine shaft, such that the numbering e.g. is ascending in the clockwise direction, in principle.

In a preferred embodiment, the method comprises controlling the rotational movement. The rotational movement can be controlled, e.g., by suitable driving of the air starter of the aircraft engine or of an external drive arranged temporarily on the aircraft engine. Even if, solely on the basis of corresponding control, it is not regularly possible to accurately determine the movement of the engine blades in the image region of the video borescope, nevertheless at least the presence of such a movement per se and in particular the basic direction of the movement can be taken into account in the comparison of two successive frames for the purpose of detecting the movement, wherein in particular the predefinition of the direction can simplify the ultimate detection of the movement. Furthermore, suitable control of the rotational movement makes it possible to ensure that the engine blades move only at a sufficiently low speed through the image region of the borescope in order that their movement can still be detected on the basis of the frames and optionally also the position of the individual engine blades vis-à-vis an arbitrarily chosen initial engine blade can be identified.

For the detection of the movement of the engine blades, in a preferred embodiment, the frames are segmented into regions which exactly reflect the contours of the individual engine blades, wherein the remaining region can then be identified as non-blade region. In comparison with image capturing methods which involve determining a bounding box around specific objects contained in an image, the segmentation yields the exact contour of the visible part of e.g. an engine blade. This enables a more accurate assignment of the individual image regions to individual engine blades. The segmentation can be effected e.g. by a convolutional neural network, such as the mask-region-based convolutional neural network (RCNN) method, for example, preferably comprising an inception feature extractor as described by He, Gkioxari, Dollar and Girshick in the article "Mask R-CNN" (arXiv.org, document number 1703.06870v3). The movement detection can then be effected by altering the segmentation of two temporally successive frames. All that is necessary for this purpose is that the movement of the engine blades is sufficiently slow, that the positions of the individual engine blades do not change too much from one frame to the next, and in particular that a specific engine blade is imaged on more than two successive frames used for detecting the movement. This last can be ensured by a suitable choice of the image refresh rate of the video borescope, a suitable choice of the number of intermediate images—not to be considered—between two frames and/or the speed of the movement of the engine blades in the image region of the video borescope.

In order to reduce the required computing power for the segmentation of frames, in a preferred embodiment, exclusion regions are defined in which the frames are not segmented. If the video image contains, e.g., regions which do not change even during movement of the engine blades—such as e.g. stator blades or stationary walls—these can be excluded by the predefinition of suitable exclusion regions prior to the segmentation, such that the segmentation need only be carried out for a section of the frames.

Irrespective of whether the detection of the movement is effected by way of the described segmentation and the subsequent comparison of successive frames or any other method, in a preferred embodiment, a direction of movement of the engine blades in the image region of the video borescope is predefined, which direction of movement is then actually complied with during the actual movement. If a direction of movement is predefined, this reduces the computational complexity of the assignment of the individual engine blades or of the individual engine blade segments during a movement. In this case, the predefinition of the direction of movement of the turbine blades in the image region of the video borescope corresponds, in principle, to a predefinition of the direction of rotation for the rotation of the engine shaft to which the turbine blades in question are secured.

The actual identification of defects on the engine blades, such as, e.g., notches or indentations, is preferably effected with the aid of a convolutional neural network, e.g. a Faster-R-CNN method, as described inter alia by Ren, He, Girshick and Sun in the article "Faster R-CNN: Towards Real-Time Object Detection with Region Proposal Networks" (arXiv.org, document number 1506.01497v3). The method is fast enough to be used in addition to the initial defect identification also for tracking a possible defect during the movement of the engine blades.

Both the Mask-RCNN method and the Faster-RCNN method are based on convolutional neural networks. However, it is also possible, in principle, to have recourse to other deep learning methods. In particular, the deep learning method ultimately used for the defect identification can continue to be improved by the above-described confirmation or rejection of the defect detection by an inspector. Moreover, the deep learning methods used are trained prior to their first use by means of suitable manually edited or evaluated training data sets each comprising frames on which the regions or features to be recognized later in an automated manner are marked. Depending on the deep learning method used, the training complexity or the complexity for creating training data sets can be reduced by a frame that forms the basis of a training data set being converted into a further data training set by mirroring, rotation or adaptation of contrast and/or brightness, wherein the ultimate complex marking of the frames—if appropriate with comparable mirroring and/or rotation—can be adopted without manual rework being required.

For the elucidation of the computer program product, reference is made to the explanations above.

FIG. 1 shows, by way of example, an exemplary arrangement 1 configured for carrying out the method according an embodiment of the invention during use for borescope inspection of an aircraft engine 80.

The aircraft engine 80 is a turbofan engine with a low-pressure compressor stage 81 comprising the fan 82, this stage being connected to a low-pressure turbine 84 via a first shaft 83, and also a high-pressure compressor stage 85, which is connected to a high-pressure turbine stage 87 via a second shaft 86. The combustion chamber is arranged between the high-pressure compressor stage 85 and high-pressure turbine stage 87.

For the inspection of the engine blades 90 of the individual stages 81, 84, 85 and 87, the engine cowling 88 has been opened (and is therefore illustrated using dashed lines), with the result that access to the core engine 89 is free. Various borescope openings 91 are provided on the core engine 89 and a video borescope 2 can be selectively inserted into them. FIG. 1 shows by way of example two borescope openings 91, into each of which a borescope 2 can be inserted in order thus to assess the engine blades 90 of a specific turbine stage—either the high-pressure compressor stage 85 or the high-pressure turbine stage 87 in the example illustrated—by means of the borescope 2. By means of rotation of that shaft 83, 86 to which the engine blades 90 to be assessed are secured—i.e. the second shaft 86 in the example—all engine blades 90 of the engine stage situated in the image region of the borescope 2 can be assessed successively. A direction of rotation, indicated by the arrow 95, is predefined for this purpose. The actual rotation of the second shaft 86 is effected by a drive unit integrated into the aircraft engine 80.

The video borescope 2 is connected to a computer unit 3 configured for the processing—described below—of the video image originating from the video borescope 2. Furthermore, the computer unit 3 also comprises an output 4 for linking to the control unit of the aircraft engine 80 in order by way thereof to control the drive unit for the second shaft 86. A terminal 5 is furthermore connected to the computer unit 3, via which terminal the video image or frames therefrom can be assessed by an inspector.

Figure 2:
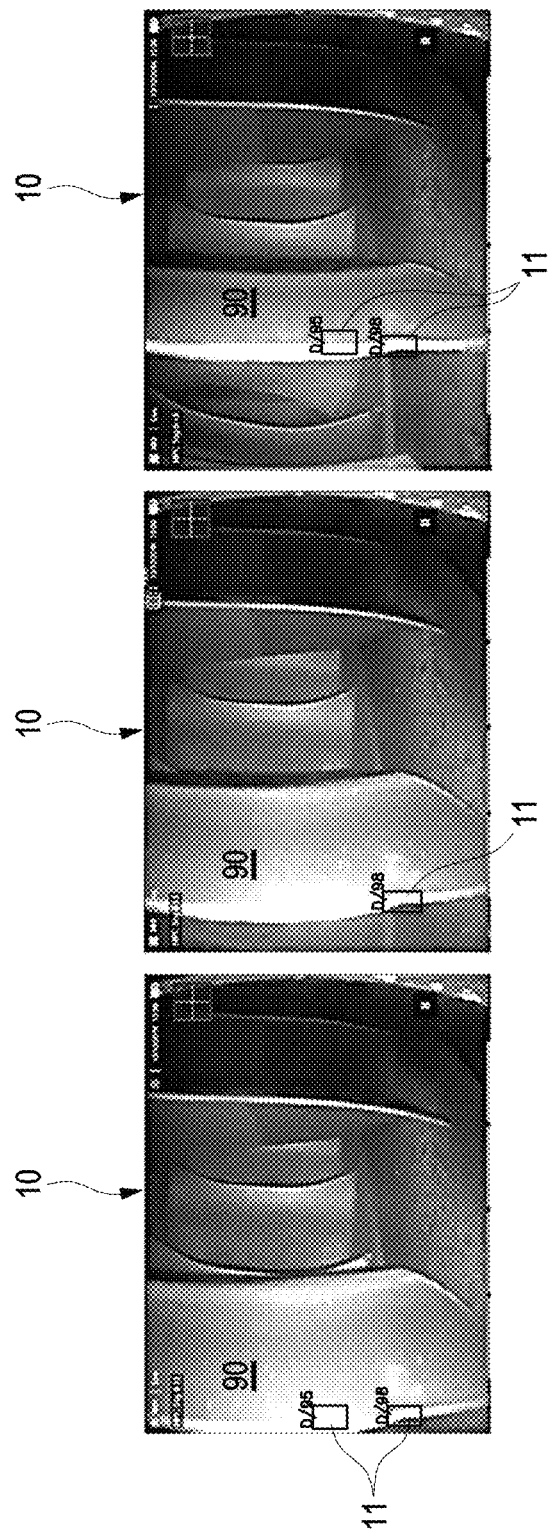
FIGS. 2a and 2b show two series of successive frames recorded by the video borescope of the arrangement in accordance with FIG. 1.
Figure 2:
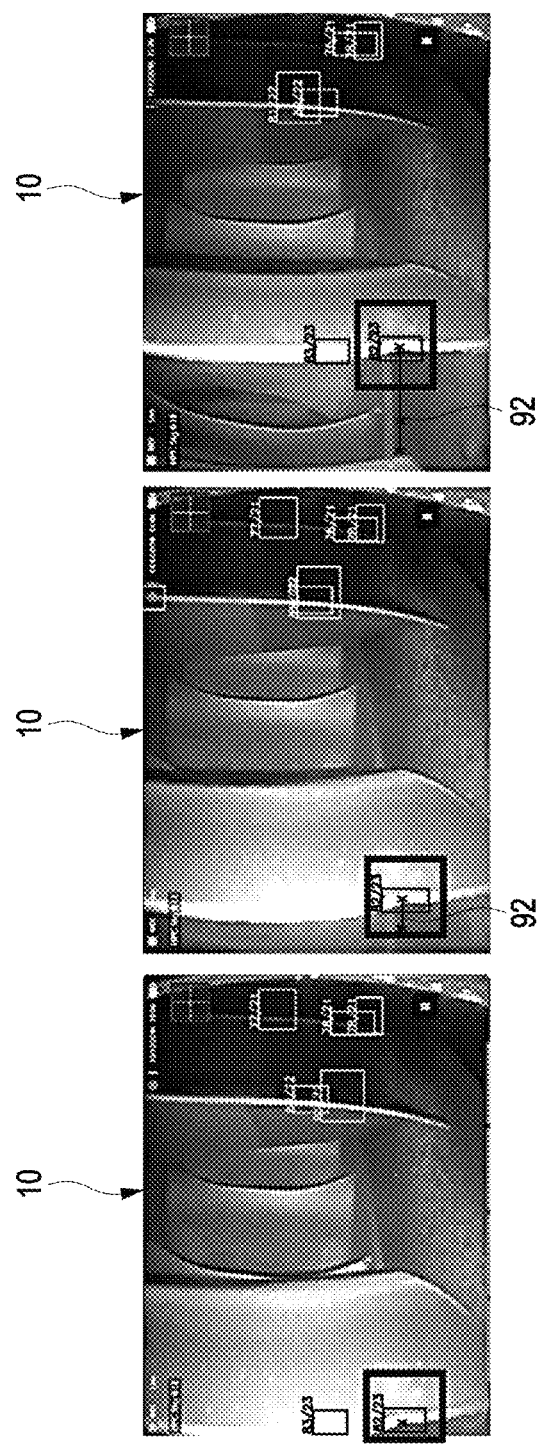

FIG. 2a shows by way of example from left to right three temporally successive frames of the video image of an individual stage of the high-pressure turbine stage 87, the video image having been recorded by the video borescope 2 in accordance with FIG. 1. Between the frames shown there are also two intermediate images in each case, which are not taken into account, however, in the processing described below and can therefore also be omitted in the illustration in FIG. 2a.

On account of a rotation of the second shaft 86 in the direction 95 of rotation shown in FIG. 1, the rotation being initiated by the computer unit 3 via the output 4, the engine blades 90 of the engine stage 87 move through the image field of the video borescope 2. Consequently, the engine blade 90 shown moves from left to right in the frames in FIG. 2a.

For each of the frames 10 in accordance with FIG. 2a, an image recognition is carried out in order to recognize possible defects. For the defect recognition, recourse is made to a suitably trained Faster-RCNN method trained in particular for recognizing notches and dents. All possible defects on the frames in accordance with FIG. 2a are marked by a box 11.

The frames 10 in accordance with FIG. 2a are also used to determine the movement of the engine blades 90 in the image region of the video borescope 2.

Figure 3:
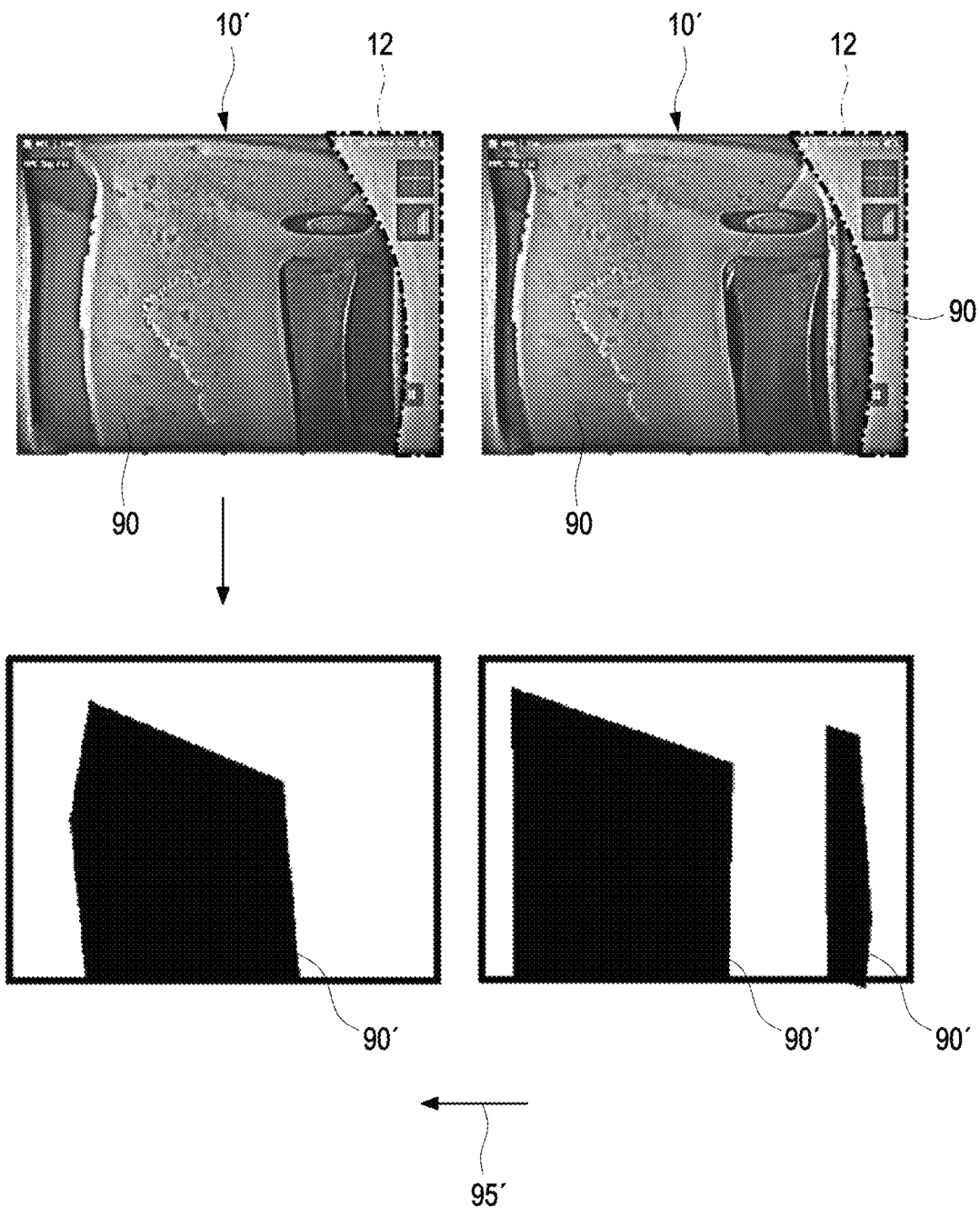
FIG. 3 shows an exemplary illustration of the segmentation of frames.

As shown by way of example in FIG. 3 on the basis of other frames 10' of a video image recorded by a borescope 2, each frame 10' is segmented into individual engine blade regions 90' with the aid of a Mask-RCNN method with an inception feature extractor (FIG. 3, bottom).

In this case, an exclusion region 12 indicated by dash-dotted lines is defined, in which the frames 10' need not be segmented since a stationary element is situated in this region 12 of the video image and the possibility that an engine blade 90 will be able to be seen in this region is thus excluded. The computing power required for the segmentation can be reduced by the definition of an exclusion region 12.

Since the computer unit 3 has initiated rotation of the second shaft 86 in the direction 95 via the output 4, as a result of which the basic direction of movement of the engine blades 90 in the image region of the borescope 2 is known, the speed and direction of the movement of the engine blades 90', which is indicated by the vector 95' in FIG. 3, can be ascertained in a simple manner on the basis of the engine blade regions 90'.

The envisaged segmentation of the frames 10' also makes it possible, in addition to the detection of the movement of the engine blades 90, to determine the relative position of the individual engine blades 90 vis-à-vis an arbitrarily chosen initial engine blade 90", which will be explained in greater detail below with reference to FIGS. 4a and b.

Figure 4:
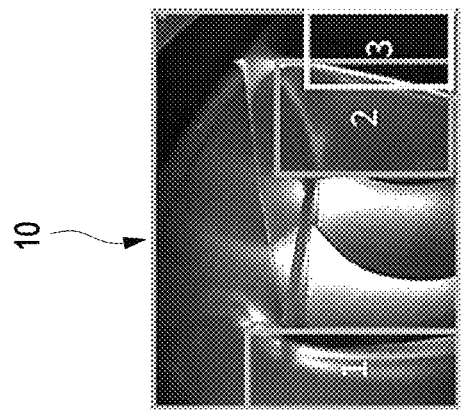
FIGS. 4a and 4b show an exemplary illustration of the movement recognition and determination of the relative position of engine blades on the basis of segmented frames.
Figure 4:
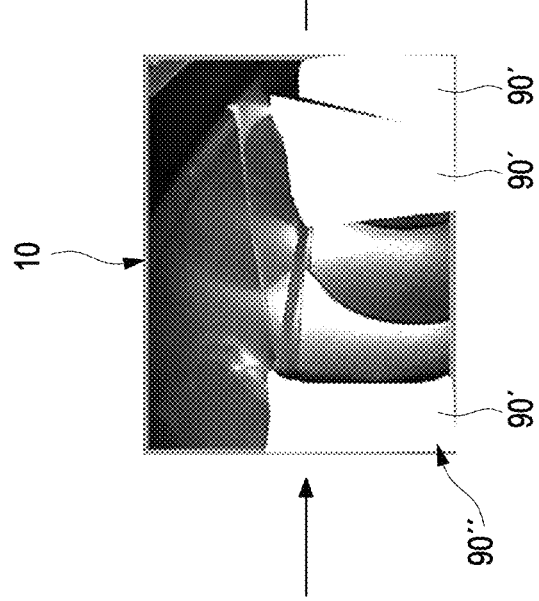
Figure 4:
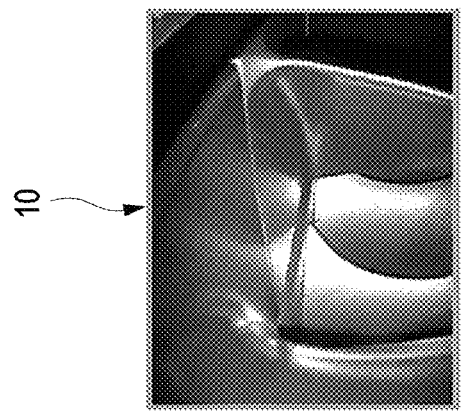
Figure 4:
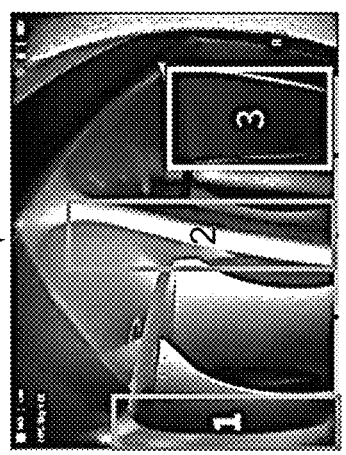
Figure 4:
Figure 4:
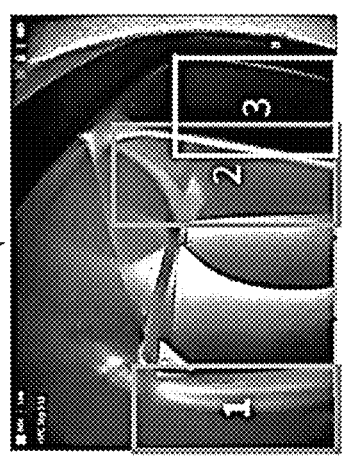

As illustrated in FIG. 4a, a frame 10" is firstly segmented in accordance with FIG. 3, wherein—if a corresponding selection has not yet been made—one of the engine blade segments 90' is defined as the initial engine blade 90". The engine blades 90 or the engine blade segments 90' can then be numbered consecutively proceeding from the initial engine blade 90".

Afterward, taking account of the detected movement of the engine blades 90, each engine blade segment 90' can be assigned a unique number corresponding to counting through the individual engine blades 90 or engine blade segments 90' (cf. FIG. 4b). By virtue of the position of the individual engine blades 90 that is detected in this way, it is possible to move individual engine blades 90 whose position was detected in a targeted manner by means of corresponding driving of the drive of the shaft 86 via the output 4 of the computer unit 3 and simultaneous checking in accordance with FIGS. 4a, b in order thus to enable e.g. the rechecking of a specific possible defect identified on the corresponding engine blades 90 on the basis of a live video image via the terminal 5.

Already on the basis of the movement of the engine blades 90 that is detected in accordance with FIG. 3, the possible defects identified in FIG. 2a can be tracked on the video image, more precisely on the frames 10 used for the movement detection. For this purpose, an optical image recognition is carried out in each case for the frames 10 in question, wherein—as in the present case—it is possible to have recourse to the image capturing described in association with FIG. 2a for identifying possible defects or the results thereof. In combination with the detected movement, for the individual possible defects, provided that they are found on all of the frames, it is possible to determine a trace 92 over the video image such as illustrated in FIG. 2b. If one of the traces 92 determined in this way has a length that is above a predefined length, the possible defect forming the trace 92 can be identified as an actual defect, which can be documented suitably in a standardized manner.

If a continuous trace 92 of sufficient length cannot be determined for a possible defect, e.g. because no defect assignable to a specific trace 92 was able to be identified on a frame 10, the possible defect is with high probability not an actual defect. Such a possible defect can nevertheless be documented and, in particular, as discussed above, by means of a process of moving in a targeted manner to the engine blade 90 with the possible defect, can be assessed once again by an inspector via the terminal 5 in order to verify the appraisal determined in an automated manner. The same also applies, of course, to the defects identified as actual defects.

The results of the verification by an inspector can be used for optimizing the image recognition of possible defects.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for automated defect detection during borescoping of an engine, in which a video borescope is inserted into the engine in such a way that, during rotation of an engine shaft, engine blades of an engine stage which are secured to the engine shaft are moved successively through the image region of the video borescope, the method comprising:
   identifying a possible defect on an engine blade by image recognition on the basis of a frame generated by the video borescope;
   detecting the movement of the engine blades in the image region of the video borescope by comparing in each case two successive frames;
   tracking the possible defect on the video image along the detected movement by optical image recognition on the basis of the successive frames used for detecting the movement; and
   in a condition where a trace of the possible defect on the video image corresponds to the detected movement in terms of direction and speed over a predefined length, identifying the possible defect as an actual defect.

2. The method as claimed in claim 1, wherein the detection of the movement of the engine blades is used to identify the position of the individual engine blades based on a position of an arbitrarily chosen initial engine blade of the engine blades.

3. The method as claimed in claim 1, wherein the method comprises controlling the rotational movement of the engine axle.

4. The method as claimed in claim 1, wherein for the detection of the movement of the engine blades, the frames are segmented into individual blade regions.

5. The method as claimed in claim 4, wherein exclusion regions are defined in which the frames are not segmented.

6. The method as claimed in claim 1, wherein a direction of movement for the engine blades in the image region of the video borescope is predefined.

7. The method as claimed in claim 1, wherein identifying the possible defect further comprises identifying a notch and/or dent on the engine blade.

8. A non-transitory computer readable storage medium comprising a computer program product comprising program parts which, when loaded in a computer, are designed for carrying out the method as claimed in claim 1.

9. The method as claimed in claim 4, wherein the frames are segmented into individual blade regions by a mask region-based convolutional neural network (RCNN) method.

10. The method as claimed in claim 9, wherein the frames are segmented into individual blade regions by an inception feature extractor.

11. The method as claimed in claim 1, wherein the two successive frames comprise the frame generated by the video borescope in which the possible defect is identified as one of the two successive frames.

12. The method as claimed in claim 1, wherein the two successive frames are generated by the video borescope after the frame generated by the video borescope in which the possible defect is identified.

* * * * *